July 10, 1945. W. B. RANNEY 2,380,367
GUM PACKAGE
Filed Aug. 31, 1944 3 Sheets-Sheet 1

INVENTOR.
Willet B. Ranney
BY
McLaughlin & Wallenstein
Attys.

July 10, 1945.  W. B. RANNEY  2,380,367
GUM PACKAGE
Filed Aug. 31, 1944  3 Sheets-Sheet 2

INVENTOR.
Willet B. Ranney
BY
McLaughlin & Wallenstein
Attys

July 10, 1945.  W. B. RANNEY  2,380,367
GUM PACKAGE
Filed Aug. 31, 1944  3 Sheets—Sheet 3
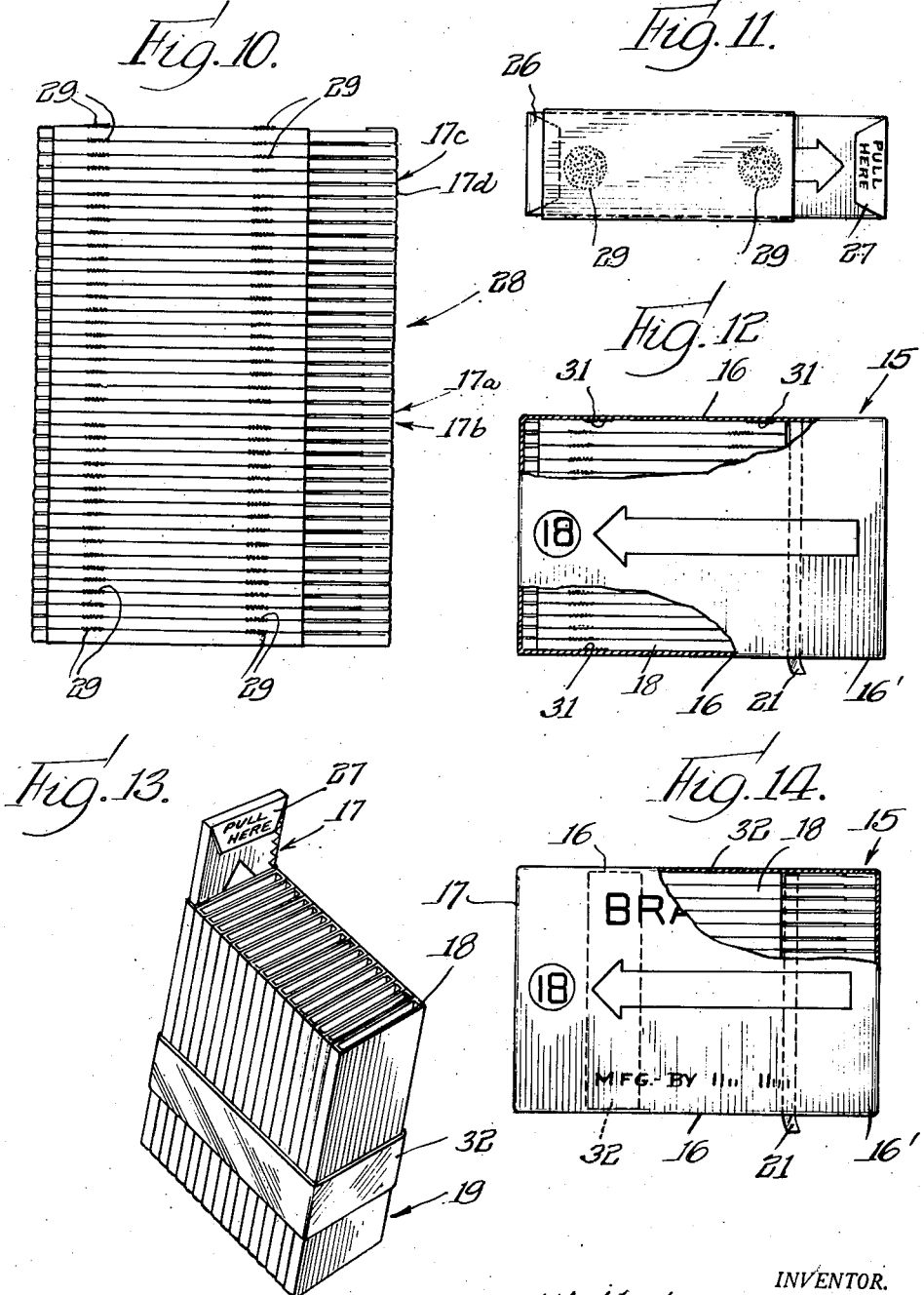

Patented July 10, 1945

2,380,367

UNITED STATES PATENT OFFICE 2,380,367

GUM PACKAGE

Willet B. Ranney, Chicago, Ill., assignor to Wm. Wrigley Jr. Company, Chicago, Ill., a corporation of Delaware Application August 31, 1944, Serial No. 552,154

6 Claims. (Cl. 206—65)

My invention relates to packages for the vending of chewing gum sticks and the like.

Chewing gum confections are usually vended in the form of sticks or in the general form of a lozenge in which the chewing gum base is surrounded and protected by a shell of hard candy-like material. The conventional gum stick is individually wrapped and is usually vended in the form of a package containing five sticks. From a merchandising standpoint, there may be certain advantages in increasing the number of gum sticks in an individual package, but up to the present the number of such gum sticks has not been greater than six and has been increased to six only in rare instances and because of economic or currency conditions. The difficulty of merchandising packages containing more than five or six sticks of gum stems from the fact that production and packaging processes and equipment have all been developed in connection with the usual five cent package and accepted merchandising and advertising requirements of the chewing gum and related industries.

The ordinary gum stick is subject to relatively rapid deterioration unless protected from contact with moisture and air. In its advanced stages deterioration is manifested by a hardening and embrittlement of the gum stick; but relatively little exposure is sufficient to cause impairment of the chewing qualities, flavor and aroma. Careful packaging is therefore necessary to preserve the gum stick against deterioration during the time required for it to move from factory to consumer. One customary procedure is to seal the outer wrapper by the use of wax coatings or the like, thus protecting the individual sticks, even though such individual sticks may not themselves be wrapped adequately to prevent deterioration. Sticks of gum intended to be vended individually, as in dispensing machines, are frequently protected with a sealed wrapper of foil or the like, but my invention is not concerned with gum sticks vended in this form. The usual package has its outer wrapper decoratively finished to feature in bold type the same general kind of information which appears on the individual gum sticks. The manufacturer is interested in displaying his brand and name under all circumstances. For this reason, the quick opening package is frequently designed to have the outer wrapper entirely removed when opened, thus leaving the individual gum sticks loose in the pocket and assuring the display of prepared advertising and merchandising matter on the individual stick wrappers. This form of package permits some exposure of individual sticks to the weather after the outer wrapper has been removed, but the consumption time for the five sticks usually is not sufficiently great to permit marked deterioration if they have originally reached the consumer in good condition.

Any proposal to merchandise a gum package containing a number of gum sticks substantially greater than five must assume the performance of operations capable of being performed on existing machinery with as little modification or adaptation of the parts thereof as possible; and it is desirable that there be no increase in packaging costs per individual stick of gum. The cost factor makes it substantially impossible to introduce an additional operation, and also prevents radical departure from standard procedures for wrapping individual sticks. In a large package, it is essential, nevertheless, to protect the individual sticks against spoilage, because the period during which they would be exposed after the outer wrapper has been opened is much greater. It is desirable also in a package containing a relatively large number of sticks that the sticks be retained in the package rather than become loose in the pocket, that the package be held against collapse, and that advertising and like material be adequately displayed, not only on the outer wrapper, but on the individual sticks as well. Heretofore, gum confections in excess of approximately five in number have been vended in some form other than a conventional gum stick, principally because no package has been available which fitted the requirements postulated hereinabove and which could be produced economically by means of standard equipment.

The principal object of my invention is the provision of an improved package for gum sticks or the like particularly adapted to contain in excess of five gum sticks.

Another object is the provision of a package satisfying the requirements postulated hereinabove and capable of being produced by means of usual existing equipment and by the practice of accepted production and packaging procedures, with only such adaptation of existing equipment as can be readily made.

The package of my invention comprises a plurality of sticks of gum or the like, each provided with an inner wrapper, and each having an outer wrapper in the form of a sleeve, with the said sleeves secured together to produce a unit assembly, the latter being disposed in an outer wrapper, one end of which is readily removable to expose ends of the gum sticks. The gum sticks are so arranged that they may be removed one stick at a time with their entire inner wrapper, but without removing the individual sleeves. Such a package holds the gum sticks in upright position regardless of the number of sticks present, and the bellows-like structure formed by the sleeves when the sticks are removed therefrom preserves the package as a whole from collapsing, even though all, or substantially all, of the sticks have been removed therefrom.

Other objects, features and advantages of the package of my present invention will be brought out in connection with the detailed description of the invention which follows the description of the drawings immediately hereinbelow.

In the drawings:

Fig. 10 shows a stack of individually wrapped gum sticks, with adhesive applied between successive sticks, in a manner and for a purpose which will be explained;

Fig. 11 is a view of an individual gum stick showing the application of adhesive to one surface thereof;

Fig. 12 is a plan view of a completed package with a portion of the outer wrapper broken away to illustrate one manner in which the bellows-like structure comprising the plurality of gum stick supports may be secured within the outer package wrapper;

Fig. 13 is a perspective view of an assembly comprising a portion of a package embodying features of my invention, the view showing a slight modification of the first referred to embodiment; and Fig. 14 is a plan view of a package including the assembly of Fig. 13, a portion of the outer wrapper being removed to illustrate the manner in which the several assembled sticks may be retained within the outer wrapper.

Having in mind the objects and general features of my invention, as pointed out hereinabove, reference will be made first to Figs. 1 to 12, inclusive, in connection with the more detailed description of the invention which follows. Of these figures, Figs. 1 to 4, inclusive, showing the entire package, are principally illustrative of the manner in which the package is used; while Figs. 5 to 12, inclusive, are principally concerned with the manner in which the package is produced.

Figure 1:
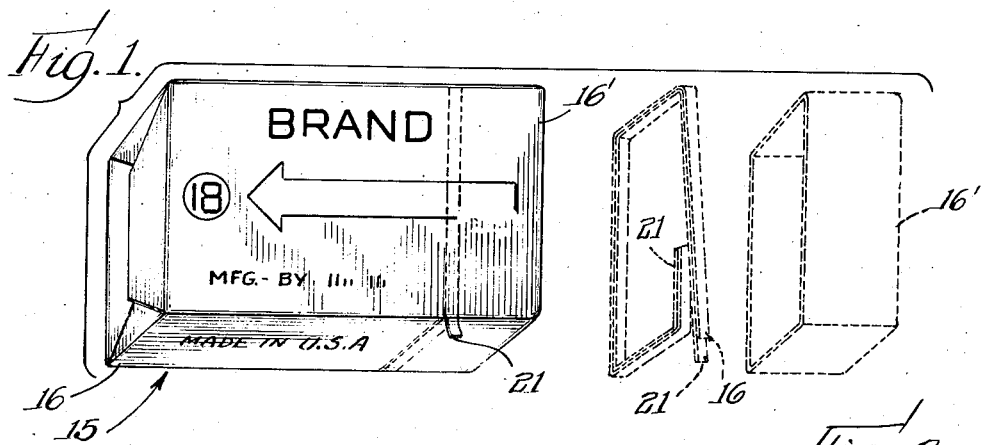
Fig. 1 is a perspective view of an unopened package constructed in accordance with the features of my invention, the view also showing in dotted lines a removed end portion of the outer wrapper with the tear strip utilized for the purpose of such removal.
Figures 2, 3:
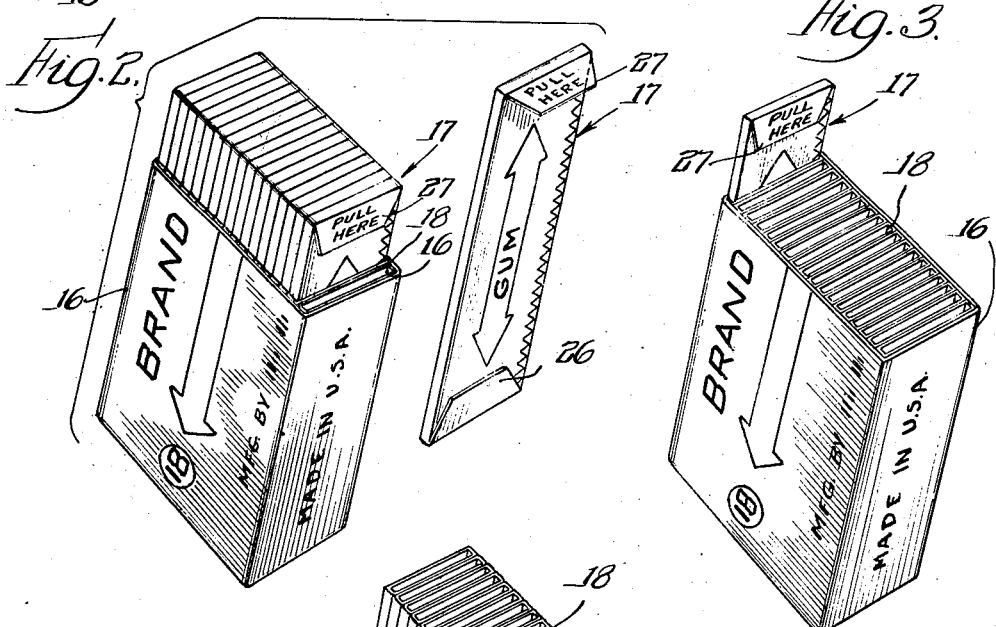
Fig. 2 shows the open package with one stick of gum removed therefrom.
Fig. 3 is a view similar to Fig. 2 with all but one stick removed, showing the manner in which the package remains intact with the single remaining stick of gum upright therein.
Figure 4:
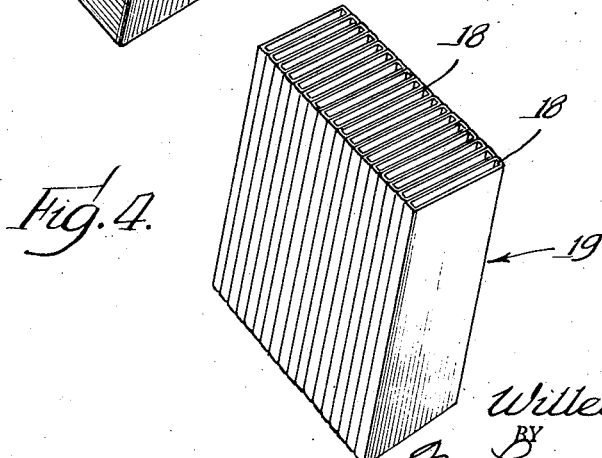
Fig. 4 shows the bellows-like structure of the assembled individual stick sleeves as such structure would appear if removed from the outer wrapper and the sticks removed therefrom.
Figure 5:
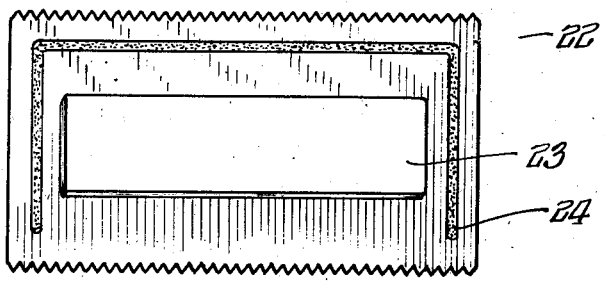
Fig. 5 shows a gum stick with its inner wrapper before application, a sealing U-shaped wax addition appearing upon the inner wrapper surface.

The completed package 15 (Fig. 1 has an outer wrapper 16, one end 16' of which is readily removable to uncover a plurality of wrapped gum sticks indicated generally by the reference characters 17—17. These gum sticks 17—17 are provided with individual wrappers in a manner which will be described, but each is disposed in a sleeve 18, all of the latter being secured together to produce a bellows-like structure 19 (see Fig. 4). The end 16' is suitably removed by means of a tearing strip 21 placed immediately below the surface of the outer wrapper 16 so that when it is removed, in the manner indicated by the dotted lines in Fig. 1, the end of the wrapper is torn smoothly from the remaining portion thereof and leaves a uniform marginal opening. The point of the tear preferably coincides approximately with the upper position of the bellows-like structure 19 formed by the sleeves 18. The drawings indicate that a single sheet is employed for the wrapper 16, but those skilled in the art will understand that any suitable wrapper construction may be employed, and the wrapper may be treated in any desirable way to seal it and protect its contents. It will be noted from Figs. 2 and 3 that regardless of the number of the sticks in the package, the outer wrapper is held against collapsing and the sticks are supported in an upright position convenient for removal of one stick at a time. Reference to other features and advantages will be made when further details of construction are brought out by reference to the remaining figures.

Figure 6:
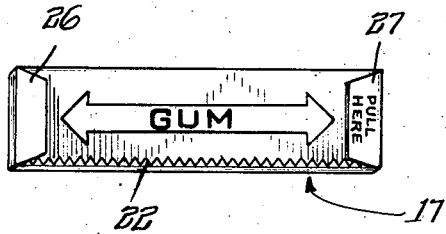
Figs. 6 and 7 show two sides of the stick with the inner wrapper applied thereto, the former figure showing the end flaps, one of which is utilized in the completed package to remove the gum stick.
Figure 7:

I have already disclosed that the package of my present invention can be produced by means of existing equipment, and without the necessity of performing any additional operations. An inner wrapper 22 is folded around a gum stick 23 by means of suitable equipment such, for example, as any of the commonly used gum wrapping machines. A U-shaped line 24 of wax or the like may be applied to the inner surface of the wrapper 22 around the gum margin, so that in the usual folding operation the wax 24 will form a seal and produce a structure in the nature of an envelope entirely surrounding the gum stick. The wrapper 22 is provided with printing on its outer surface as indicated in Figs. 6 and 7. The wrapper 22 may be any suitable gum wrapping sheet material including aluminum foil, if desired, or a composite of two or more sheets such as a thin sheet of foil backed with a thin sheet of "waxed" paper. I have found that the foil may be directly printed to provide for advertising, identification of the product, the brand and the flavor, or any like indicia which the manufacturer may wish to disclose. In the folding operation, ends of the inner wrapper are folded over to produce flaps 26 and 27. The latter flap preferably is printed with a suitable legend, such as shown, to indicate that it may be grasped for the removal of an individual gum stick from the completed package. Fig. 6 shows the side of the wrapped gum stick on which the end flaps appear and Fig. 7 shows the reverse side for comparison.

After a gum stick has been wrapped to produce a product as shown in Figs. 6 and 7, an outer wrapper 18 in the nature of a sleeve is applied thereto. This sleeve 18 may also be applied by means of standard equipment (with only minor adaptation in the parts thereof), since it corresponds generally to the usual printed outer wrapper heretofore applied to individual gum sticks. It differs from the customary outer wrapper, however, in that it is formed of plain unprinted paper, and instead of overlapping the flaps 26 and 27 in the customary manner, it overlaps the flap 26 but terminates a substantial distance short of the flap 27. It is a plurality of such sleeves 18 which forms the structure 19 indicated in Fig. 4. By forming the sleeves 18 so that they terminate a substantial distance short of the flaps 27, the wrapped gum sticks are caused to project upwardly from the finished package in the manner shown in Figs. 2 and 3.

Figure 8:
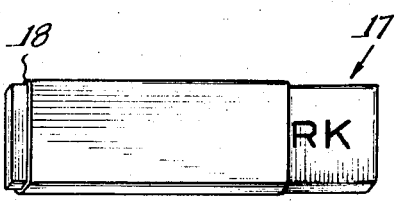
Figs. 8 and 9 show two sides of the individual gum stick after the plain paper sleeve has been applied over the wrapper.
Figure 9:
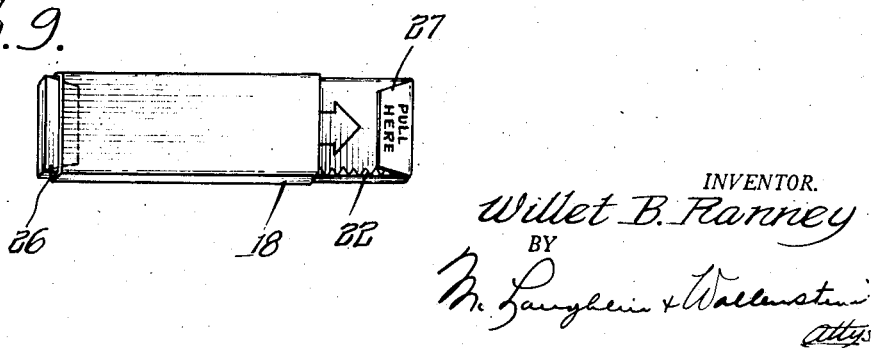

When the sticks are completed in the form shown in Figs. 8 and 9, they are assembled to form a stack of individually wrapped sticks such as indicated generally by the reference character 28 in Fig. 10. From a stack such as 28, the requisite number of sticks may be withdrawn in groups and severally wrapped by means of standard equipment. One convenient way of producing the structure of my present invention, wherein the sleeves 18 of a package are held together, is to apply spots 29 of suitable adhesive between the sleeves near the ends thereof. Sticks 17a—17b and 17c—17d, intended to comprise the separation point between groups of sticks which later will be wrapped together, are not tprovided with adhesive. In Fig. 10 I show groups of 18 sticks corresponding to the number of sticks shown in the remaining assembly figures, but the number of sticks adhesively secured together may be varied automatically by merely adjusting the adhesive supplying equipment to the number of sticks required.

The groups of sticks secured together in the manner indicated in Fig. 10 are then wrapped to form completed packages, adhesive, as indicated at 31, preferably being provided at suitable places between the sleeves 18 and the inside surface of the outer wrapper 16. Fig. 12 shows this adhesive applied at spots along the sides of the package, but the adhesive may be automatically applied to any desired areas during the wrapping operation. The outer wrapper 16 with the tearing strip 21, or other opening device, is applied by the use of known and regularly used automatic wrapping machines, no additional operation being required because of any feature which my invention incorporates in the package.

Figs. 13 and 14 show a modification identical with the first described embodiment except for the provision of a band 32 surrounding the individually wrapped sticks and sleeves as particularly shown in Fig. 13. I have found that in order properly to wrap the outer wrapper around the plurality of sticks comprising either the structure indicated in Fig. 12 or the structure indicated in Fig. 13, it is essential that the said structure be held square. While this may be done in various ways, I have found that the use of the band 32 is particularly advantageous and preferably should be approximately in the position shown in Fig. 12. Since there is a greater amount of paper at one end of the package than the other, a sub-assembly banded tightly in the middle of the sticks by means of a relatively narrow band will expand more at one end than at the other; but if the band is placed closer to the end containing the greater amount of paper, then this end may be held in compressed condition and the sub-assembly of Fig. 13 will then be held "square." Maintaining this condition is substantially essential to permit application of the outer wrapper.

The band 32 may comprise a material similar to the well known "Scotch tape," or it may comprise a narrow band of plain paper which is coated with adhesive on one side thereof as it is delivered to the banding station. If the band is completely coated with adhesive on one side thereof, then it becomes secured to all of the sleeves 18 and it is unnecessary to apply adhesive between them as described in connection with Figs. 10 and 11. I may, however, apply adhesive in the general manner indicated in Figs. 10 and 11 in which event the band 32 may be applied in position without necessarily being adhesively secured to all of the sleeves. It should, in any event, be secured to the sleeves sufficiently to comprise with the sleeves a firm structure.

The assembly shown in Fig. 13 may either be secured adhesively within the outer wrapper 16 or it may be left unattached thereto. Generally speaking, if the outer wraper 16 has been applied relatively tightly, there will be sufficient tendency for the assembly to expand within the outer wrapper to hold it in position whether it is adhesively secured to the wrapper or not. In general, I prefer to apply adhesive between the outer wrapper and the sleeves 18 because such adhesive may be readily applied during the wrapping operation and some advantage is obtained by its use. In producing the form of package shown in Figs. 13 and 14, I may proceed in the same general manner as in the case of the package described in the first embodiment. The individual sticks are wrapped in the manner previously described, and they may either be stacked in the manner shown in Fig. 10 and adhesive applied between them or the requisite number of sticks may be delivered directly to the wrapping equipment where the band 32 is applied in position. I have found that existing equipment may be modified so that the band 32 may be applied to a group of sticks in the manner described as the sticks are moving through the equipment, and without the necessity of performing an additional handling operation.

The features of my invention are readily understood by the assumption of a package containing eighteen sticks (as an illustration) such as might be vended to the trade at somewhat less than the usual price of one cent per stick. Such a package is slightly smaller than the usual cigarette package and its features and advantages may be considered by reference to such a standard cigarette package. When the latter is partially empty, the package collapses, and the contents lose the protection afforded when the package was held in firm position. The contents of the package of my present invention remain in an upright easily accessible position regardless of the number of articles which have been removed. The end flap of only one stick is accessible for pull out purposes, but such flap is readily accessible, the bottom flap of each stick being retained within its sleeve so that the stick is very easily removed. Removal of one stick exposes the pull tab of the next succeeding stick.

In addition to the protection afforded to the individual sticks by the wax seal 24 on the inner wrapper, the package itself functions to protect the contents in that the wrapping material on each stick remains tightly compressed against the stick until the stick is pulled out. This is a distinct advantage from the standpoint of moisture resistance and is due in large part to the provision of the bellows-like structure remaining within the outer wrapper or shell when the sticks are removed.

From a merchandising and advertising standpoint, the package of my present invention offers a distinct advantage to the manufacture. Since there is a single wrapping on each stick at the time it is withdrawn and this may be printed with such advertising matter as may be desired, the user is bound to see such advertising matter whenever a stick is withdrawn from the package. This feature may be contrasted with that prevailing when sticks are provided with double wrappers, the outer one in the nature of a sleeve, wherein such outer wrappers frequently remain in the original package as the sticks are withdrawn. With a package of this type, the manufacturer is put to the expense of printing such labels but at least a portion of the printing cost is wasted. I have pointed out that in order to be sure that the consumer will see the advertising matter on the individual sticks, some present day packages are so constructed that the entire package wrapper or shell is removed when the package is opened, leaving the individual sticks loose. In this style of package, the larger advertising surface on the package itself is in part wasted. The package of my present invention affords a contrast in this regard in that the outer wrapper of the completed package is maintained against collapsing until the last stick is withdrawn, and all of the relatively large amount of advertising space provided by such a package remains available for the entire period required to consume all of the gum sticks.

I have described my invention as particularly applicable to the packaging of gum sticks, but those skilled in the art will understand that any product generally similar to a gum stick may be packaged in accordance with my present invention, the scope of which is defined in the claims.

What I claim as new and desire to protect by Letters Patent of the United States is:

1. A package comprising a plurality of sticks of gum or the like each completely enveloped in a printed inner wrapper, said inner wrapper being folded to form end flaps lying flat against the said sticks, a sleeve disposed around each said wrapper, to enclose one end flap, but terminating short of the other end flap so as to leave the same uncovered, means securing said sleeves together to form a bellows-like structure thereof, and an outer wrapper disposed around such plurality of sticks, said outer wrapper provided with means for removing one end thereof at a point substantially coinciding with the point of termination of said sleeves, whereby said sticks may be removed one at a time by grasping an exposed end flap, but the said sleeves are retained together in the outer wrapper to prevent collapse thereof and hold the sticks remaining therein in an upright position.

2. A package comprising a plurality of sticks of gum or the like each completely enveloped in a printed inner wrapper, said inner wrapper being folded to form end flaps lying flat against the said sticks, a sleeve disposed around each said wrapper, to enclose one end flap, but terminating short of the other end flap so as to leave the same uncovered, means securing said sleeves together to form a bellows-like structure thereof, and an outer wrapper disposed around such plurality of sticks, and secured to said sleeves, said outer wrapper provided with means for removing one end thereof at a point substantially coinciding with the point of termination of said sleeves, whereby said sticks may be removed one at a time by grasping an exposed end flap, but the said sleeves are retained together in the outer wrapper to prevent collapse thereof and hold the sticks remaining therein in an upright position.

3. A package comprising a plurality of sticks of gum or the like each completely enveloped in a printed inner wrapper, said inner wrapper being folded to form end flaps lying flat against the said sticks, a sleeve disposed around each said wrapper, to enclose one end flap, but terminating short of the other end flap so as to leave the same uncovered, adhesive being provided between said sleeves to hold them together in a bellows-like structure, and an outer wrapper disposed around such plurality of sticks, and secured to said sleeves, said outer wrapper provided with means for removing one end thereof at a point substantially coinciding with the point of termination of said sleeves, whereby said sticks may be removed one at a time by grasping an exposed end flap, but the said sleeves are retained together in the outer wrapper to prevent collapse thereof and hold the sticks remaining therein in an upright position.

4. A package comprising a plurality of sticks of gum or the like each completely enveloped in a printed inner wrapper, said inner wrapper being folded to form end flaps lying flat against the said sticks, a sleeve disposed around each said wrapper, to enclose one end flap, but terminating short of the other end flap so as to leave the same uncovered, a band extending around said sleeves and securing the same together to form a solid structure, and an outer wrapper disposed around such plurality of sticks, said outer wrapper provided with means for removing one end thereof at a point substantially coinciding with the point of termination of said sleeves, whereby said sticks may be removed one at a time by grasping an exposed end flap, but the said sleeves are retained together in the outer wrapper and form a bellows-like structure as the sticks are severally removed therefrom and thus prevent collapse of the package and hold the sticks remaining therein in an upright position.

5. A package comprising a plurality of sticks of gum or the like each completely enveloped in an inner wrapper folded over to form end flaps, a sleeve disposed around a portion of each said wrapper and extending over the end flap at one end of the sticks but not at the other, means securing said sleeves together, and an outer wrapper disposed around said plurality of wrapped sticks and provided with means for removing one entire end of the said outer wrapper whereby to expose ends of the said plurality of individually wrapped sticks at a point generally coincident with one end of the said sleeves, whereby one such flap of an inner wrapper is always presented to view for facilitating removal of such stick, but all other flaps being folded flat against their sticks whereby to facilitate sealing and protection thereof, and whereby said sticks with their inner wrappers may be individually withdrawn from said sleeves and outer wrapper without causing collapsing of the package.

6. A package comprising a plurality of sticks of gum or the like each completely enveloped in an inner wrapper folded over to form end flaps, a sleeve disposed around a portion of each said wrapper and extending over the end flap at one end of the sticks but not at the other, means securing said sleeves together, and an outer wrapper disposed around said plurality of wrapped sticks and provided with means for removing one entire end of the said outer wrapper whereby to expose ends of the said plurality of individually wrapped sticks at a point generally coincident with one end of the said sleeves, whereby one such flap of an inner wrapper is always presented to view for facilitating removal of such stick, but all other flaps being folded flat against their sticks whereby to facilitate sealing and protection thereof, each such exposed flap bearing a legend indicating that it may be grasped for the removal of a gum stick, and whereby said sticks with their inner wrappers may be individually withdrawn from said sleeves and outer wrapper without causing collapsing of the package.

WILLET B. RANNEY.